(12) United States Patent
Lin et al.

(10) Patent No.: US 8,339,437 B2
(45) Date of Patent: Dec. 25, 2012

(54) VIDEO COMMUNICATION METHOD, VIDEO COMMUNICATION SYSTEM AND INTEGRATED MEDIA RESOURCE SERVER

(75) Inventors: Lin Lin, Shenzhen (CN); Xiaojun Mo, Shenzhen (CN); Yanyu Wu, Shenzhen (CN); Yu Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1029 days.

(21) Appl. No.: 11/837,005

(22) Filed: Aug. 10, 2007

(65) Prior Publication Data

US 2008/0039150 A1 Feb. 14, 2008

(30) Foreign Application Priority Data

Aug. 11, 2006 (CN) .......................... 2006 1 0062099

(51) Int. Cl.
*H04N 7/14* (2006.01)
*H04M 1/00* (2006.01)

(52) U.S. Cl. .................. 348/14.01; 455/566; 348/14.02; 348/14.03; 348/14.04; 348/14.05; 348/14.07

(58) Field of Classification Search .............. 348/14.02, 348/14.01; 455/566
See application file for complete search history.

(56) References Cited

U.S. PATENT DOCUMENTS

| | | | |
|---|---|---|---|
| 5,712,906 A | 1/1998 | Grady et al. | |
| 5,802,283 A | 9/1998 | Grady et al. | |
| 5,835,130 A | 11/1998 | Read | |
| 6,351,279 B1 * | 2/2002 | Sawyer | 348/14.07 |
| 6,545,697 B1 * | 4/2003 | Parker et al. | 348/14.01 |
| 2003/0046705 A1 | 3/2003 | Sears | |
| 2003/0063590 A1 | 4/2003 | Mohan | |
| 2004/0097188 A1 | 5/2004 | Tanimoto | |
| 2004/0180689 A1 | 9/2004 | Nayak | |

(Continued)

FOREIGN PATENT DOCUMENTS

CN 1503548 A 6/2004

(Continued)

OTHER PUBLICATIONS

1st Office Action in corresponding Chinese Application No. 200610062099.3 (Mar. 7, 2008).

(Continued)

*Primary Examiner* — Christopher M Brandt
*Assistant Examiner* — Muthuswamy Manoharan
(74) *Attorney, Agent, or Firm* — Leydig, Voit & Mayer, Ltd.

(57) ABSTRACT

The present invention discloses a video communication method and system, wherein, during an audio conversation between a calling party and a called party, an IMRS (Integrated Media Resource Server) plays a video to the calling party or the called party; or when a calling party initiates a video phone call request to a called party which does not support video phone call, an audio channel is established between the calling party and the called party and a video channel is established between the calling party and an IMRS, and when an audio conversation is established between the calling party and the called party, the IMRS plays video to the calling party; or when an audio conversation and a video conversation are established between a calling party and a called party, one party replaces its video with that played to the other party by the IMRS, therefore capabilities of developing new communication services are improved.

6 Claims, 3 Drawing Sheets

U.S. PATENT DOCUMENTS

| | | |
|---|---|---|
| 2004/0249962 A1 | 12/2004 | Lecomte |
| 2005/0180338 A1 | 8/2005 | Pirila |
| 2005/0221826 A1 | 10/2005 | Lee |
| 2007/0201484 A1* | 8/2007 | Kenrick et al. ............ 370/395.5 |
| 2007/0263824 A1* | 11/2007 | Bangalore et al. ....... 379/202.01 |

FOREIGN PATENT DOCUMENTS

| | | |
|---|---|---|
| CN | 1510901 A | 7/2004 |
| CN | 1525757 A | 9/2004 |
| CN | 1536852 A | 10/2004 |
| CN | 1574872 A | 2/2005 |
| CN | 1747498 A | 3/2006 |
| JP | 2000092463 * | 3/2000 |
| JP | 2002125208 | 10/2000 |
| KP | KR2005-0093425 | 9/2005 |
| KR | 2001-0093615 A | 10/2001 |
| KR | 2004-0035522 A | 4/2004 |
| KR | 2007-0000229 A | 1/2007 |
| KR | 2007-0049384 A | 5/2007 |
| NL | PCT/IB2003/004025 | 4/2004 |
| TW | 255639 B | 5/2006 |

OTHER PUBLICATIONS

1$^{st}$ Office Action in corresponding Chinese Application No. 200780000261.1 (Jul. 24, 2009).

Written Opinion of the International Searching Authority in corresponding PCT Application No. PCT/CN2007/000895 (Jul. 5, 2007).

Notice of Allowance in corresponding Korean Application No. 2007-0080690 (Nov. 16, 2009).

* cited by examiner

VIDEO COMMUNICATION METHOD, VIDEO COMMUNICATION SYSTEM AND INTEGRATED MEDIA RESOURCE SERVER

This application claims the benefit of CN Application No. 200610062099.3 filed on Aug. 11, 2006, titled "METHOD AND SYSTEM FOR VIDEO COMMUNICATION", which is incorporated herein by reference in its entirety.

FIELD OF THE INVENTION

The present invention relates to the field of video communications, in particular, to a video replace method, a video replace system and an integrated media resource server.

BACKGROUND OF THE INVENTION

The 3rd Generation Mobile Communication Network (3G) and Next Generation Communication Network (NGN), in which soft switch is used as a control core and Packet Switched Network (PSN) is adopted as a transmission network, are comprehensive and fully open network platforms that may simultaneously provide various services such as voice, data, and multimedia.

In the existing video communication technologies, both parties in a communication may replace a video, but the video to be replaced is downloaded into a user communication terminal by the user himself/herself, and then transmitted to the opposite party. Due to the memory limitation of a communication terminal, the amount of videos that may be replaced and the capability of a service provider to develop new services, such as advertising, are restricted.

The existing 3GPP (The 3rd Generation Partnership Project) Protocol specifies a video phone call process, which is used for realizing video call between 3G users. However, due to problems with 3G network or a user terminal, video call between 3G users cannot be successful all the time. Therefore, 3GPP Protocol also specifies specifications on video call fallback. According to the 3GPP specifications, a calling user is prompted to re-initiate an ordinary voice call when the video phone call fails. Also, in a conventional video call technology, an ordinary voice call is automatically placed again after a video phone call fails. In the prior arts, when a video phone call initiated by a calling user fails, only an ordinary voice call may be re-initiated, and no video may be played to the calling user at the same time when an audio conversation is directly connected between the calling user and the called user, thus the application of new communication operating modes is limited.

SUMMARY OF THE INVENTION

Some embodiments of the present invention provide a video communication method, a video communication system and an integrated media resource server, and thereby a new method for providing video services is provided and types of services are enriched.

A technical solution provided by an embodiment of the present invention is as follows:

A video communication method includes the step of playing a video to a calling party and/or a called party by an Integrated Media Resource Server during an audio conversation between the calling party and the called party.

A video communication system is provided in another embodiment of the present invention. The video communication system at least includes a calling communication terminal and a called communication terminal, and further includes an integrated media resource server connected with the calling communication terminal and the called communication terminal respectively, adapted to establish a video channel between the integrated media resource server and at least one of the calling communication terminal and the called communication terminal, to store a video, and to play a video to at least one of the calling communication terminal and the called communication terminal.

An integrated media resource server is provided in another embodiment of the present invention. The integrated media resource server includes:

A video storing unit, adapted to store a video; an information processing unit, adapted to establish a video channel between the integrated media resource server and at least one of a calling communication terminal and a called communication terminal, and to extract a video from the video storing unit and playing it to the communication terminal(s).

According to an embodiment of the invention, a video is played to a calling party and/or a called party by an integrated media resource server, so that it may be avoided that a calling party cannot receive a video after a video phone call initiated by the calling party fails. A brand-new mode for realizing video service is provided, and the capability of developing new communication services is improved.

DETAILED DESCRIPTION OF EMBODIMENTS

The invention will now be further described in detail in conjunction with the drawings and the specific embodiments.

Figure 1:
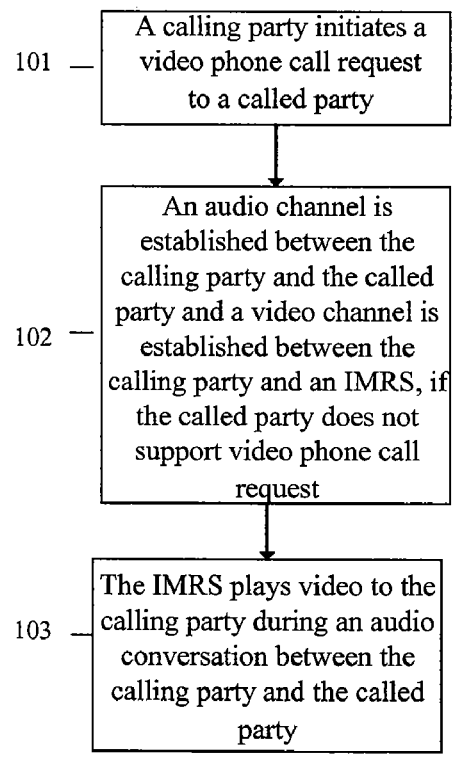
FIG. 1 is a flow chart of a video communication method according to an embodiment of the invention.

FIG. 1 is a flow chart of a video communication method according to an embodiment of the invention. As shown in FIG. 1, the method includes the following processes:

Block 101: A calling party initiates a video phone call request to a called party;

Block 102: If the called party does not support the video phone call request, an audio channel is established between the calling party and the called party, and a video channel is established between the calling party and an integrated media resource server (IMRS).

The case that the called party does not support the video phone call request includes: the network of the called party does not support the video phone call request; the terminal of the called party does not support the video phone call request; or the video phone call request is rejected by the called party.

Block 102 may also include more detailed processes: first, the current mobile switch center of the called party sends a message that the called party does not support the video phone call request to the IMRS; the IMRS then determines whether to perform a call fallback takeover according to records customized by the calling party, records customized by the called party, or instructions set by the IMRS, which are stored in the IMRS and are illustrative but non-exhaustive. If it is determined that there is no need for the IMRS to perform a call fallback takeover, no video channel is established between the calling party and the IMRS; or if it is determined that there is a need for the IMRS to perform a call fallback takeover, an audio channel is established between the calling party and the called party, and a video channel is established between the calling party and the IMRS.

The audio channel between the calling party and the called party may be established in the following two modes:

Mode 1: The IMRS, after receiving a message that the called party does not support the video phone call request, initiates an ordinary voice call to the called party and establishes an audio channel between the calling party and the called party;

Mode 2: The calling party, after receiving a message that the called party does not support the video phone call request, automatically initiates an ordinary voice call and establishes an audio channel between the calling party and the called party.

Block 103: The IMRS plays a video to the calling party during an audio conversation between a calling party and a called party.

The calling party or the called party may determine a video to be played to the calling party before the IMRS plays the video to the calling party, or the calling party or the called party may determine a video to be played to the calling party or modify a video to be played to the calling party during the video conversation between the calling party and the called party. For example, the calling party or the called party may select a video to be played on the interface of its communication terminal. However, it may be that the IMRS directly plays a video to the calling party, without the selection by the calling party or the called party. The video played may be a video customized by the called party, a video customized by the calling party, or a video automatically sent by the IMRS. If the IMRS stores therein the video customized by the called party, the video customized by the calling party and the video automatically sent by the IMRS or any two of these three videos, the IMRS may select and play a video to the calling party according to the priorities of the videos.

The video communication method will now be further described in detail according to three embodiments.

Figure 2:
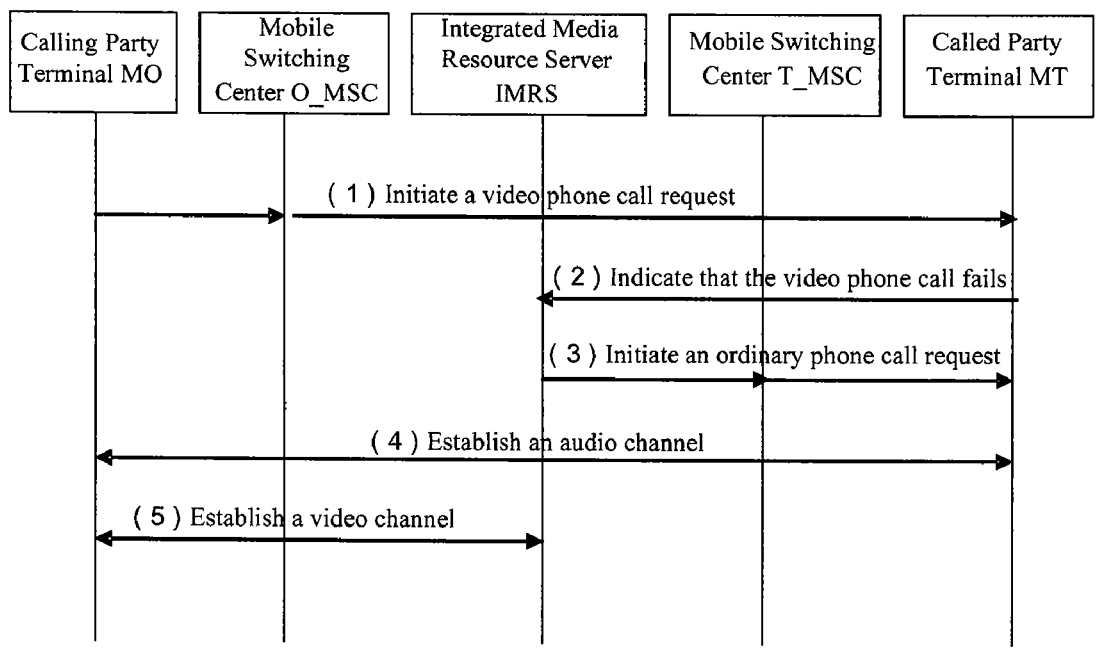
FIG. 2 is a flow chart of a video communication method according to an embodiment of the invention in which an integrated media resource server establishes an audio channel between a calling party and a called party.

FIG. 2 is a flow chart of a video communication method according to an embodiment of the invention in which an IMRS establishes an audio channel between a calling party and a called party. As shown in FIG. 2, the video communication method includes the following steps:

Step (1): A calling terminal (MO, Mobile Originated) initiates a video phone call request by dialing the number of a called terminal (MT, Mobile Terminated), the current mobile switching center of the calling party (O_MSC) initiates a video phone call to the IMRS according to the number of the called party, the IMRS initiates a video phone call to the current mobile switching center of the called party (T_MSC), and the T_MSC pages the called party;

Step (2): The T_MSC finds that the called party cannot support the video phone call request, and returns a REL message (Release message) to the IMRS which indicates that the video phone call fails;

After this step, it may proceed with Step (3) directly, or the IMRS determines whether to proceed with the subsequent Step (3) according to records customized by the calling party, records customized by the called party, or instructions set by the IMRS. If it is determined that there is no need to perform a call fallback takeover for the video phone, it may not proceed with the subsequent steps any more; if it is determined that there is a need to perform a call fallback takeover for the video call, it may proceed with the subsequent steps.

Step (3): The IMRS initiates an ordinary voice call request to the MT;

Step (4): The MO and the MT establish an audio channel via the IMRS; specifically including:

The IMRS initiates an ordinary voice call request to the T_MSC according to the number of the called party; the T_MSC pages the called party; the MT sends an Alerting message to the T_MSC when the called party is paged successfully; the T_MSC, after receiving the Alerting message, sends an ACM (Address Complete Message) message to the IMRS; the IMRS sends the ACM message to the O_MSC; the O_MSC sends an Alerting message to the MO, which indicates that the called terminal rings; the MT sends a CONNECT message to the T_MSC after the called party hooks off; the T_MSC, after receiving the CONNECT message, sends an ANM message (Answer) to the IMRS; the IMRS sends the ANM message to the O_MSC; and the O_MSC sends a CONNECT message to the MO, which indicates that the called terminal hooks off.

The process of Step (4) is not limited to the above embodiment, and the process may also be realized in other ways.

Step (5): The IMRS establishes a video channel with the calling party MO; specifically including:

The capability used for this call is selected from the terminal capability set supported by the calling party and the capability set supported by the IMRS through TCS (Terminal Capability Set) message interaction between the calling party and the IMRS, in which the calling party MO employs H.245 Protocol (responsible for establishing a media channel). The master-slave relationship between the called party and the IMRS is determined via an MSD (Master-Slave Determination), thus the master-slave relationship for control of the media channel in this call is determined. Multiplex Table information is exchanged between the two parties via an LMS (Local Multiplex table Send information) message. Finally a media channel is opened via an OLC (Open Logic Channel) message. The capability negotiation is completed and a network video channel is established.

After a video channel is established between the MO and the IMRS, a video may be directly played to the calling party. The video may be a video customized by the called party, a video customized by the calling party, or a video sent automatically by the IMRS.

The process of Step (5) is not limited to the above embodiment, and the process may also be realized in other ways.

Alternatively, Step (4) and Step (5) are implemented simultaneously, or Step (4) is implemented first, and then Step (5); or Step (5) is implemented first, and then Step (4).

Thus, an audio channel is established between the calling party and the called party, and a video channel is established between the calling party and the IMRS. The calling party may see the video played by the IMRS when an audio conversation starts between the calling party and the called party.

Figure 3:
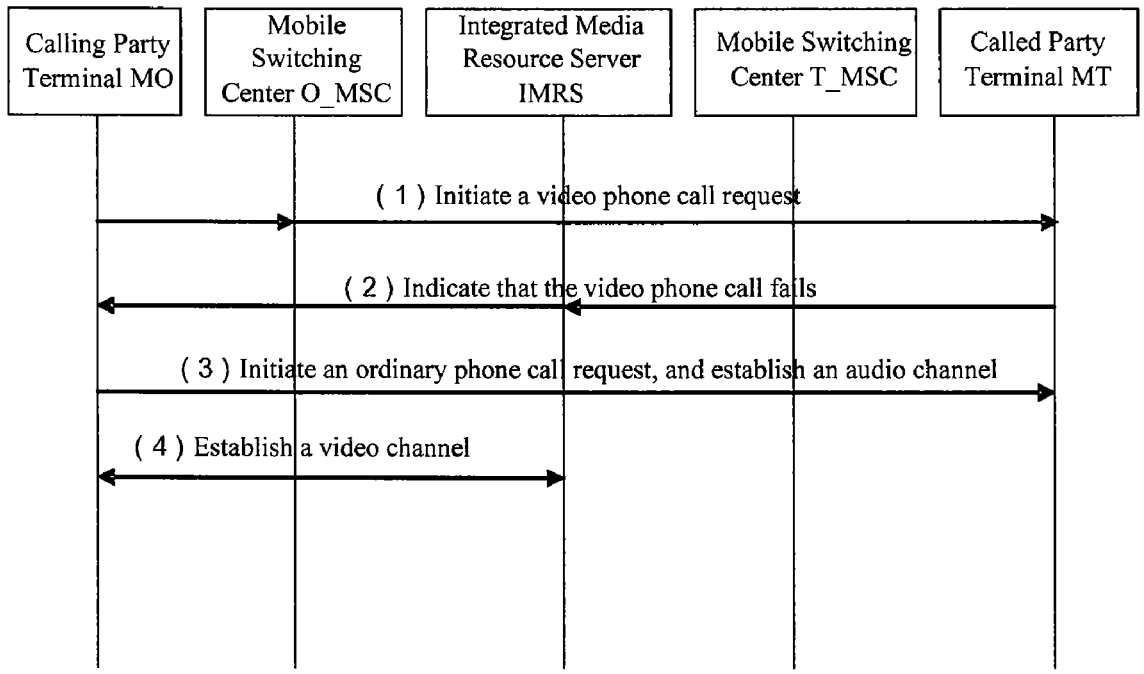
FIG. 3 is a flow chart of a video communication method according to an embodiment of the invention in which a calling party establishes an audio channel to a called party.

FIG. 3 is a flow chart of a video communication method according to an embodiment of the invention, in which a calling party establishes an audio channel with a called party. As shown in FIG. 3, the video communication method includes the following steps:

Step (1): A calling terminal MO initiates a video phone call request by dialing the number of a called terminal MT. The current mobile switching center O_MSC of the calling party initiates a video phone call to an IMRS according to the number of the called user. The IMRS initiates a video phone call to the current mobile switching center T_MSC of the called party according to the number of the called party. The T_MSC pages the called party;

Step (2): The T_MSC finds that the called party cannot support the video phone call request, and returns a REL message (Release message) to the IMRS and the MT. The message indicates that the video phone call fails. The video call failure information is sent to the MO;

Step (3): The MO automatically initiates an ordinary voice call request to the called terminal MT and establishes an audio channel with the MT;

Step (4): The IMRS, after receiving the REL message, establishes a video channel with the MO;

However, Step (3) and Step (4) are implemented simultaneously, or Step (3) is implemented first and then Step (4); or Step (4) is implemented first and then Step (3).

Figure 4:
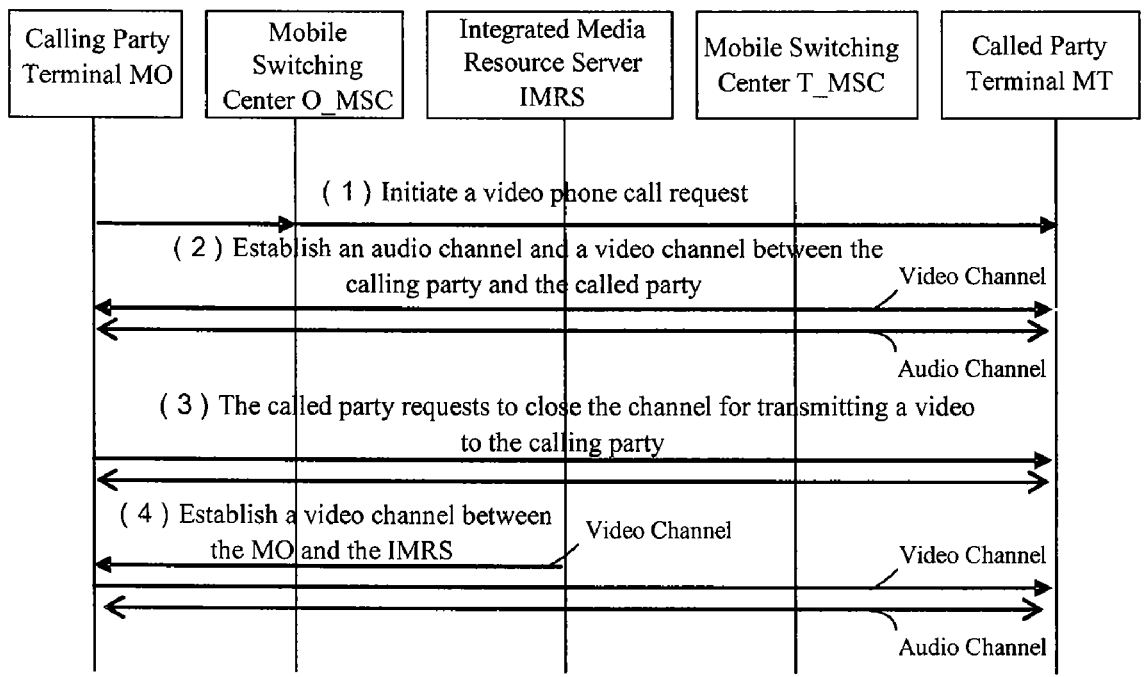
FIG. 4 is a flow chart of a video communication method according to an embodiment of the invention in which a called party replaces video.

FIG. 4 is a flow chart of a video communication method according to an embodiment of the invention, in which the called party replaces videos. The video communication method includes the following steps:

Step (1): A calling terminal MO initiates a video phone call request by dialing the number of a called terminal MT. The current mobile switching center O_MSC of the calling party initiates a video phone call to an IMRS according to the number of the called user. The IMRS initiates a video phone call to the current mobile switching center T_MSC of the calling party according to the number of the called user. And the T_MSC pages the called party;

Step (2): The T_MSC establishes an audio channel and a video channel between the calling party and the called party after it successfully pages the called party.

Specifically, when the T_MSC successfully pages the called party, the MT sends an Alerting message to the T_MSC. The T_MSC, after receiving the Alerting message from the MT, sends an ACM message to the IMRS. The IMRS sends the ACM message to the O_MSC. The O_MSC sends an Alerting message to the MO, the Alerting message indicating that the called terminal rings. The MT sends a CONNECT message to the T_MSC after the called party hooks off. The T_MSC, after receiving the CONNECT message from the MT, sends an ANM message to the IMRS. The IMRS sends the ANM message to the O_MSC. The O_MSC sends a CONNECT message to the MO, the CONNECT message indicating the called terminal hooks off. The capability used for this call is selected from the capability set supported by the MO and the capability set supported by the MT through TCS message interaction between the MO and the MT. During the selection of the capability used for this call, the MO employs H.245 Protocol. The master-slave relationship between the MO and the MT is determined via an MSD message, thus the master-slave relationship for the control of the media channels in this call is determined. Multiplex table information of both parties is exchanged via an LMS message. And finally, the channels for transceiving an audio stream and a video stream are opened via an OLC message. The capability negotiation is completed and the network is put through. The IMRS transparently transmits the messages and records the related information.

After the negotiation between the calling party and the called party is completed, a voice channel and a video channel are established between the calling party and the called party, and an audio conversation and a video conversation start between the calling party and the called party;

Step (3): The called party decides to replace the video to be exchanged with the calling party, sends a CLC (Close Logic Channel) message to the calling party, and closes the channel for transmitting a video to the calling party;

Step (4): The IMRS, after detecting that the called party closes the video channel, sends an OLC message to the calling party according to the information maintained therein, and establishes a video channel between the IMRS and the calling party.

After the video channel is established, the IMRS plays a video file customized by the called party to the calling party. Then, a video conversation starts between the calling party and the called party, and the called party may see the video of the calling party, while the calling party may see a video customized by the called party.

FIG. 4 illustrates an embodiment of the present invention, in which the called party customizes a video for the calling party. However, it may also be appreciated that the calling party may also customize a video for the called party, that is, the calling party may see the video of the called party, while the called party may see the video customized by the calling party. It may be that one of the calling party and the called party customizes a video for the other, that is, one of the two parties closes the channel for transmitting video to the other party, and then, the IMRS will establish a video channel with the party that cannot receive a video of the opposite party and transmitting a video to the party that cannot receive a video of the opposite party. It may also be that both the calling party and the called party customize a video for each other; that is, both parties close the channels for transmitting video to the other party, and then, the IMRS will transmit videos to both parties.

Additionally, in another alternative embodiment: a calling party initiates a video phone call request to a called party, establishes an audio channel between the calling party and the called party, establishes a video channel between the calling party and an IMRS and establishes a video channel between the called party and an IMRS. The IMRS plays videos to the calling party and the called party during the audio conversation between the calling party and the called party.

Figure 5:
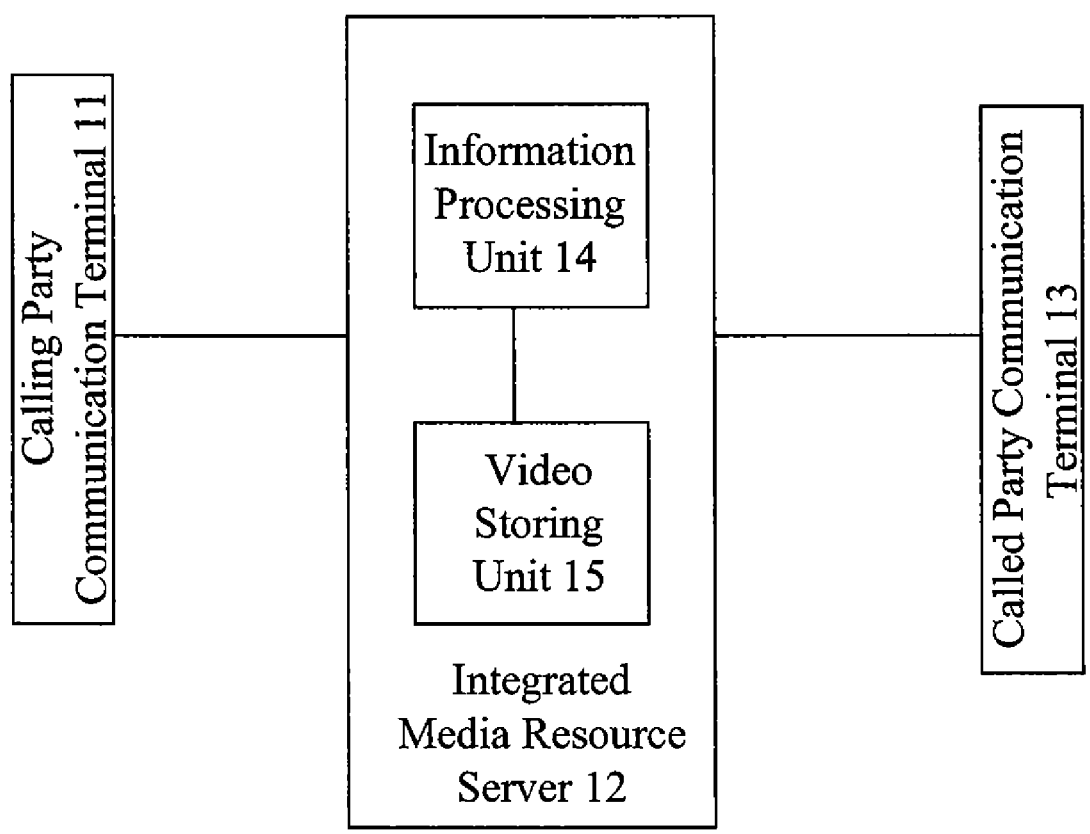
FIG. 5 is a structural schematic diagram of a video communication system according to an embodiment of the invention.

FIG. 5 is a structural schematic diagram of a video communication system according to an embodiment of the invention. As shown in FIG. 5, the system mainly includes a calling communication terminal MO 11, an IMRS 12, and a called communication terminal MT 13.

The IMRS 12 is used for establishing a video channel between the IMRS and at least one of the calling communication terminal and the called communication terminal, storing videos, and playing a video to the communication terminal(s).

The IMRS 12 may also be used for establishing an audio channel between the MO and the MT when the MO and the MT cannot establish an audio channel.

The IMRS 12 may include an information processing unit 14 and a video storing unit 15.

The information processing unit 14 is used for establishing a video channel between the IMRS and at least one of the calling communication terminal and the called communication terminal, extracting a video from the video storing unit and playing it to the communication terminal(s).

The video storing unit 15 is used for storing videos.

And the information processing unit 14 may also be used for establishing an audio channel between the MO and the MT.

The MO 11 must have the function of video phone communication.

The MT 13 may or may not have the function of video phone.

Referring to FIG. 5, according to an embodiment of the present invention, an IMRS is provided. The IMRS includes:

A video storing unit 15, for storing videos; and

An information processing unit 14, for establishing a video channel between the IMRS and at least one of the calling communication terminal and the called communication terminal, extracting a video from the video storing unit and playing it to the communication terminal(s).

The information processing unit 14 is further used for establishing an audio channel between the MO and the MT.

According to an embodiment of the invention, a video may be played to the calling party and/or a called party by an IMRS, so that it may be avoided that a calling party cannot receive a video after a video phone call initiated by the calling party fails. A brand-new mode for realizing video service is provided, which solves the following problems: the capacity of replaceable videos is too small, the video communication service is single, and the calling party cannot receive a video if a video phone call fails. With the use of the present invention, video phone call fallback is taken over, the success ratio of a video phone call is improved, a video replace function is provided, and the capability of developing new communication services is improved.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

What is claimed is:

1. A method for video communication, comprising:
    playing a video to only one of a calling party and a called party by an Integrated Media Resource Server (IMRS) during an audio conversation between the calling party and the called party;
    wherein the playing the video to only one of the calling party and the called party by the IMRS comprises:
    initiating, by the calling party, a video phone call request to the called party;
    establishing an audio channel and a video channel between the calling party and the called party;
    keeping, by the only one of the calling party and the called party, the video channel open for receiving a video transmitted by an opposite party, and closing the video channel for transmitting a video to the opposite party;
    establishing, by the IMRS, a video channel with the opposite party that cannot receive a video of the only one of the calling party and the called party that closed the video channel for transmitting a video; and
    transmitting, by the IMRS, a video to the opposite party that cannot receive the video of the only one of the calling party and the called party which closed the video channel for transmitting a video during an audio conversation between the calling party and the called party.

2. The method for video communication according to claim 1, wherein the video sent to one party by the IMRS is one of a video selected by the other party and a video sent automatically by the IMRS.

3. The method for video communication according to claim 1, wherein before the establishing, by the IMRS, the video channel with the opposite party that cannot receive a video of the only one of the calling party and the called party that closed the video channel for transmitting a video, the method further comprises:
    detecting that the only one of the calling party and the called party closed the channel for transmitting a video to the opposite party.

4. The method for video communication according to claim 1, wherein before the closing, by the only one of at least one of the calling party and the called party, the video channel for transmitting a video to the opposite party, the method further comprises:
    deciding, by the only one of at least one of the calling party and the called party, to replace the video to be exchanged with the opposite party, and sending a CLC (Close Logic Channel) message to the opposite party.

5. A system for video communication, at least comprising a calling communication terminal and a called communication terminal, wherein the system further comprises:
    an IMRS (Integrated Media Resource Server), connected with the calling communication terminal and the called communication terminal configured to establish a video channel between the IMRS and only one of the calling communication terminal and the called communication terminal, to store videos, and to play a video to the only one of the calling communication terminal and called communication terminal;
    wherein, only one of the calling communication terminal and the called communication terminal is further configured to keep open a channel for receiving a video transmitted by an opposite party and to close the video channel for transmitting a video to the opposite party; and
    the IMRS is further configured to establish a video channel with the opposite party that cannot receive a video of only one of the calling party and the called party that closed the video channel for transmitting a video, opposite party, and to transmit the video to the opposite party that cannot receive the video of the only one of the calling party and the called party that closed the video channel for transmitting a video opposite party during an audio conversation between the calling party and the called party.

6. The system for video communication according to claim 5, wherein the IMRS is further configured to detect that the only one of the calling party and the called party closed the channel for transmitting a video to the opposite party.

* * * * *

UNITED STATES PATENT AND TRADEMARK OFFICE
CERTIFICATE OF CORRECTION

PATENT NO. : 8,339,437 B2  
APPLICATION NO. : 11/837005  
DATED : December 25, 2012  
INVENTOR(S) : Lin et al.

Page 1 of 1

It is certified that error appears in the above-identified patent and that said Letters Patent is hereby corrected as shown below:

In the Claims

Claim 4, Column 8, line 18 "of at least one of the calling party" should read

-- of the calling party --.

Claim 5, Column 8, lines 42-43 "a video, opposite party, and" should read

-- a video and --.

Claim 5, Column 8, line 46 "a video opposite party during" should read

-- a video during --.

Signed and Sealed this
Seventeenth Day of September, 2013

Teresa Stanek Rea
*Deputy Director of the United States Patent and Trademark Office*